(12) United States Patent
Xie

(10) Patent No.: US 7,695,593 B2
(45) Date of Patent: Apr. 13, 2010

(54) HELICAL FRACTIONATING COLUMN

(76) Inventor: Fusheng Xie, Room 502, Unit 2, Building 23, Chuan Taibei Area, Qilu Shihua Living Zone, Linzi District, Zibo City, Shangdong Province (CN) 255400

( * ) Notice: Subject to any disclaimer, the term of this patent is extended or adjusted under 35 U.S.C. 154(b) by 461 days.

(21) Appl. No.: 11/341,700

(22) Filed: Jan. 28, 2006

(65) Prior Publication Data
US 2006/0124431 A1    Jun. 15, 2006

(51) Int. Cl.
*B01D 3/32* (2006.01)
*B01D 3/06* (2006.01)

(52) U.S. Cl. .................. 196/98; 196/133; 196/139; 202/158; 261/114.3; 261/114.4; 261/114.5

(58) Field of Classification Search ............ 196/98, 196/133, 139; 202/158; 261/114.3–114.5, 261/DIG. 72, DIG. 74
See application file for complete search history.

(56) References Cited

U.S. PATENT DOCUMENTS

| | | | | |
|---|---|---|---|---|
| 3,959,419 A | * | 5/1976 | Kitterman | 261/98 |
| 4,151,232 A | * | 4/1979 | Slobodyanik | 261/114.1 |
| 5,262,094 A | * | 11/1993 | Chuang et al. | 261/97 |
| 5,632,962 A | * | 5/1997 | Baker et al. | 422/211 |

* cited by examiner

*Primary Examiner*—Virginia Manoharan
(74) *Attorney, Agent, or Firm*—Raymond Y. Chan; David and Raymond Patent Firm

(57) ABSTRACT

The helical fractionating column according to the invention falls into the field of oil separation apparatus for the petroleum refining industry, which includes a column body (8), and is characterized in that the inside of the column body (8) is divided into three sections, the lower section being jet tray section, the middle section being packing section, and the upper section being floating valve section. The helical fractionating column has many advantages, such as having enhanced integrity of separation, decoloration and deodorization, simple structure, convenient manufacturing and maintenance, and low investment cost as well as high product quality etc. Thus, the present invention is worthy to be extended in the petroleum refining industry which uses waste plastics and rubbers as raw materials.

13 Claims, 8 Drawing Sheets

HELICAL FRACTIONATING COLUMN

TECHNICAL FIELD

The helical fractionating column according to the invention falls into the field of oil separation apparatus.

BACKGROUND OF INVENTION

Fractionating columns include two groups in general: plate-type column and packed column. The function of the fractionating column is only to separate components, wherein the little impurities in the product, which brings an unconventional color and odor to the product, need to be removed by using specific technologies and devices for decoloration and deodorization. This requires complicated devices, and huge investment cost, especially in the petroleum refining process utilizing waste plastics and rubbers as raw materials. In addition, there is no up-to-grade oil product till now.

DISCLOSURE OF INVENTION

The technical solution of the invention is to provide a helical fractionating column which can remove little impurities from the product during the separation of components, and the maintenance thereof is convenient, thus raising the quality of product and overcoming shortages present in the prior art. It is valuable to be popularized in the petroleum refining industry utilizing waste plastics and rubbers as raw materials.

The solution of the present invention is that the inside of the column body 8 of the helical fractionating column is divided into three sections, the lower section being jet tray section, the middle section being packing section, and the upper section being floating valve section.

The jet tray section is jet tray 3, in the shape of a plate, having many jet fins 31 separately set thereon. One end of the jet fin 31 is fixed and the other end is cocked, forming an angle with jet tray 3, commonly in 20-60°, preferably, 22.5-36°. The angles increase gradually layer by layer, in same degree or not. In the present invention, the enlargement of the angles is 180° for layers 1-5, with 36° enlargement for each layer. The cocked angles are from 0° to 360°, based on the request of design. The jet tray 3 can be set up in multilayers based on the request of design, preferably, 1-5 layers. When the jet tray 3 is set up, every layer is turned an angle parallelly to the next layer, commonly, 20-60°, preferably, 22.5-36°. The angles are turned from 0° to 360°, clockwise or counterclockwise, based on the request of design. For better adsorption, a coke adsorption layer can be paved on the upper side of the jet tray 3.

The floating valve section is a floating valve tray 6, and comprises an outside wall of the tray, spherical floating valves 27, and overflow weirs 11, wherein the overflow weirs 11 are set on the two ends of floating valve tray 6, and separate the floating valve tray 6 into four areas, namely a floating valve area in the middle, a liquid-receiving area 28 on one side, a liquid-falling area 30 on the other side, and bubble areas 29 on two ends of the floating valve area. The spherical floating valves 27 distribute equally, triangularly, within the floating valve area.

The floating valve trays 6 are set on the upper side and lower side of the packing layer 15, in multilayer, preferably, 8 layers on the upper side and one layer on the lower side.

The packing section comprises a packing layer 15 wherein one layer of floating valve trays 6 is formed on each side of the packing layer 15. The packing layer 15 is one layer of regular fillers selected from metal Pall ring, metal net, metal netted corrugated pattern and metal puncture corrugated pattern.

The virtues of the helical fractionating column according to the present invention, in comparison with that of the prior art, are as follows:

The lower section of the helical fractionating column is a jet tray section equipped with a jet tray 3, the jet fins 31 of which turn up with the cocked angles being enlarged gradually layer by layer in a degree of 20-60°, from 0° to 180-360°. The jet tray 3 is set up in multilayers, with every layer being turned an angle parallelly to the next layer, commonly, 20-60°, so as to form a helical path. Gas-flow ascends along the helical path with turning of 180° or 360°, thus prolonging the retention period of gases in column body 8 and enhancing adsorption effect.

The middle section of the helical fractionating column is a packing section. The packing layer 15 of the packing section serves in the function of further filtering gases to remove impurities.

The upper section of the helical fractionating column is a floating valve section. The floating valve tray 6 in the floating valve section has floating valves 27 arranged triangularly, enabling gas and liquid distributed equally and providing good effects of adsorption due to the large contact area of gas and liquid. The gas-flow from the jet tray section, through a layer of floating valve, enters into the packing section to be filtered, then enters into the floating valve section to be fractionated, and raises continuously to the top of the column. The top of the column is equipped with a quencher 21, and the liquid cooled returns to the top of the column body 8 to form a convection with the gas raising to the upper section of the column body 8. Therefore, good quality products can be obtained in high yield, with reduced formation of waste heavy oil.

The gaseous medium forms a spiral with a prolonging retention time in the column body 8. Thus, the effect of fractionation is good.

In addition, the helical fractionating column has such advantages as having enhanced integrity of separation, decoloration and deodorization, simple structure, convenient manufacturing and maintenance, and low investment cost as well as high product quality etc. Therefore, the present invention is worthy to be extended in the petroleum refining industry which uses waste plastics and rubbers as raw materials.

PREFERRED EMBODIMENTS

Figure 1:
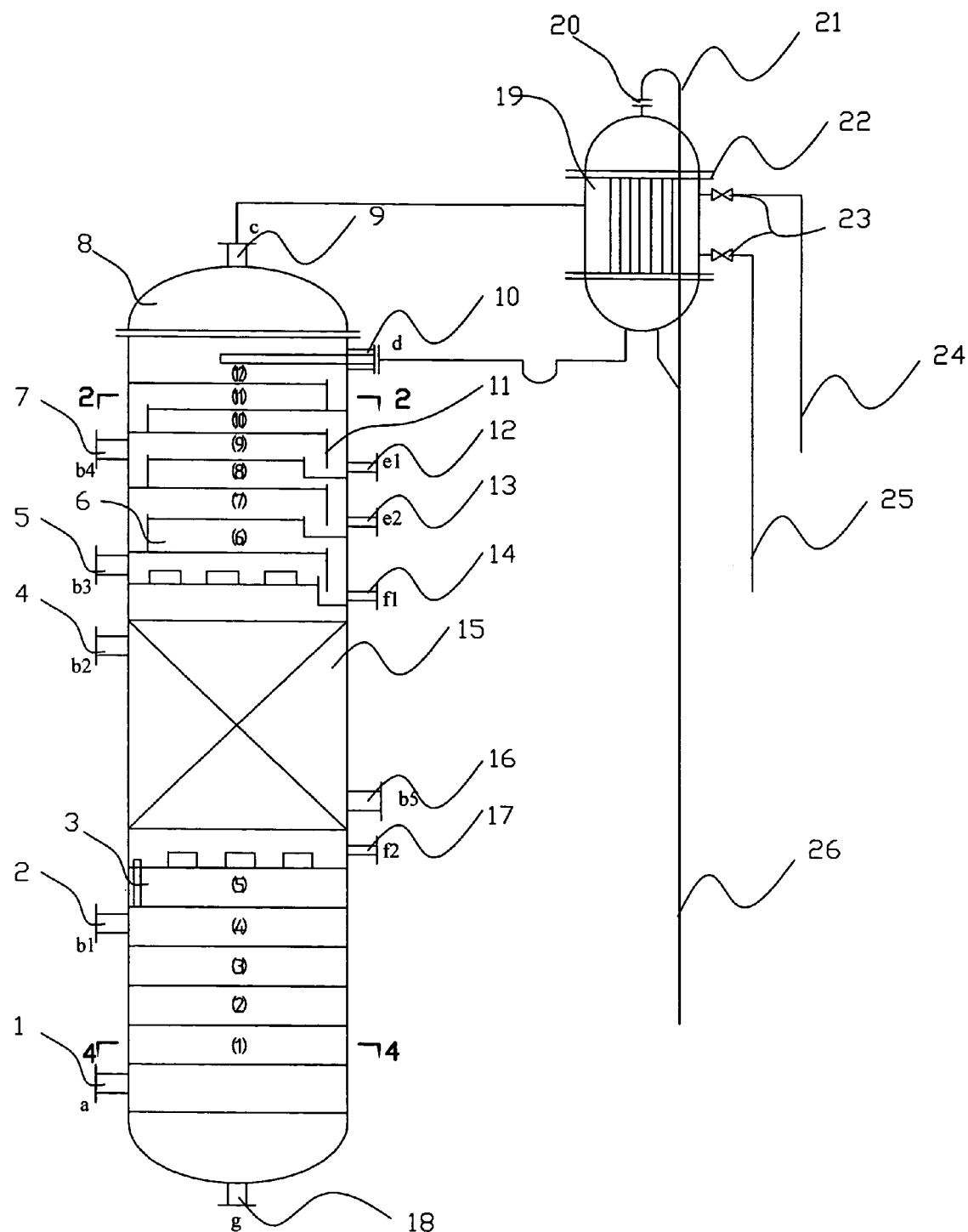
FIG. 1 is a section view of the structure of the helical fractionating column.
Figure 2:
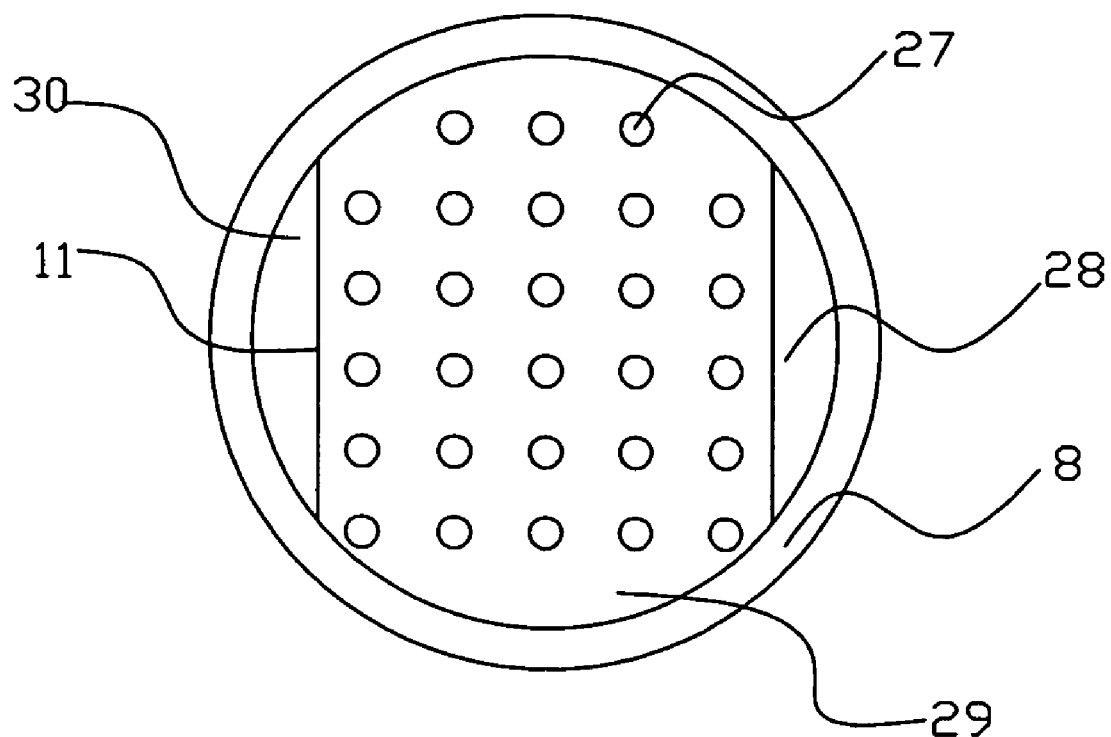
FIG. 2 is a 2-2 section view of the floating valve tray 6 in FIG. 1.
Figure 3:
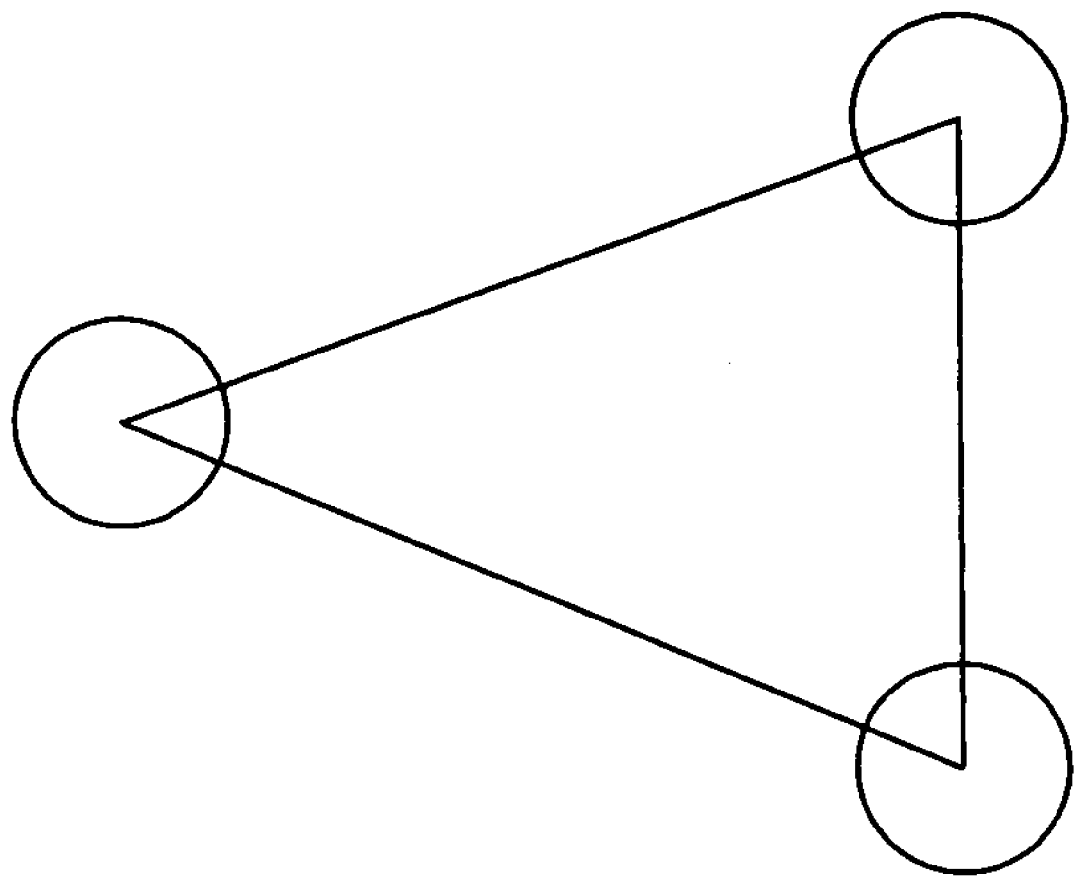
FIG. 3 is a schematic diagram showing the triangular arrangement of the floating valves in the floating valve tray 6 of FIG. 2.
Figure 4:
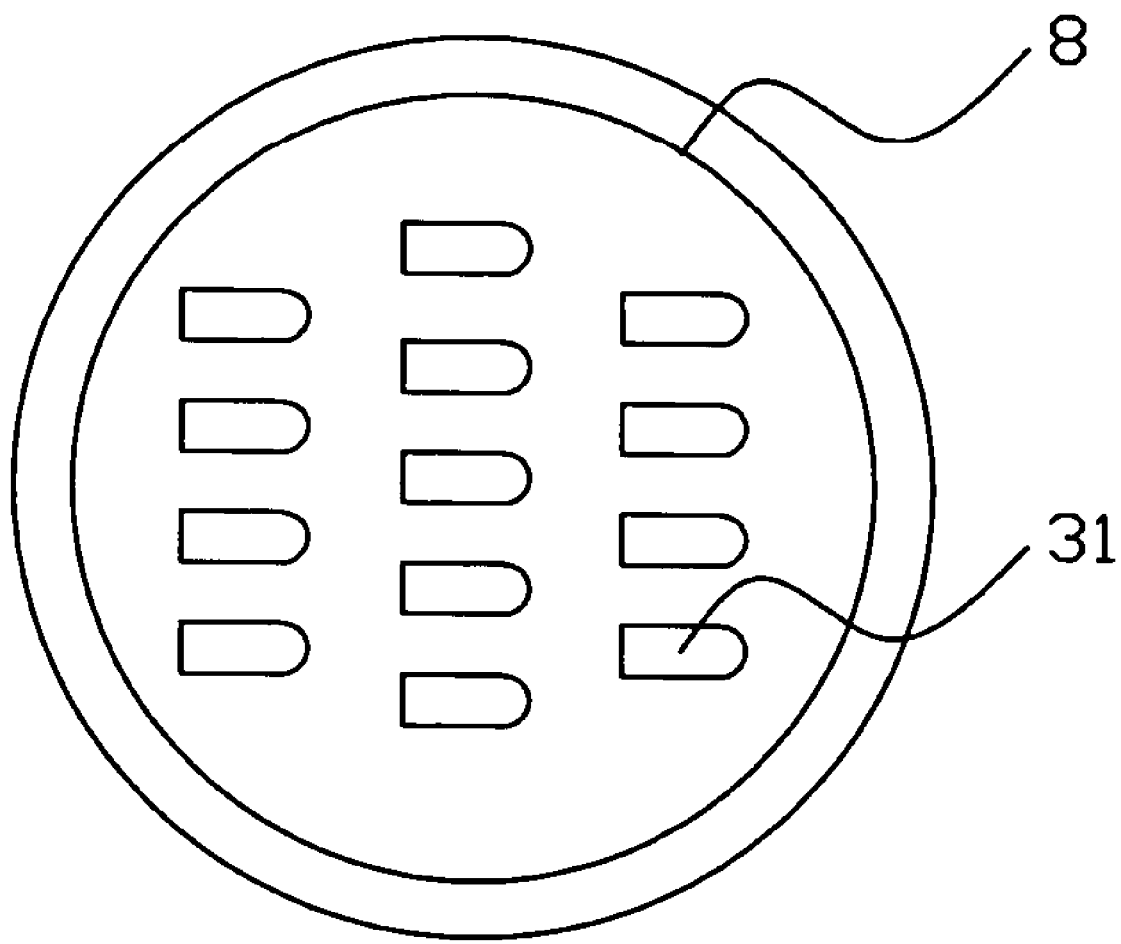
FIG. 4 is a 4-4 section view of the jet tray 3 in FIG. 1.
Figure 5:
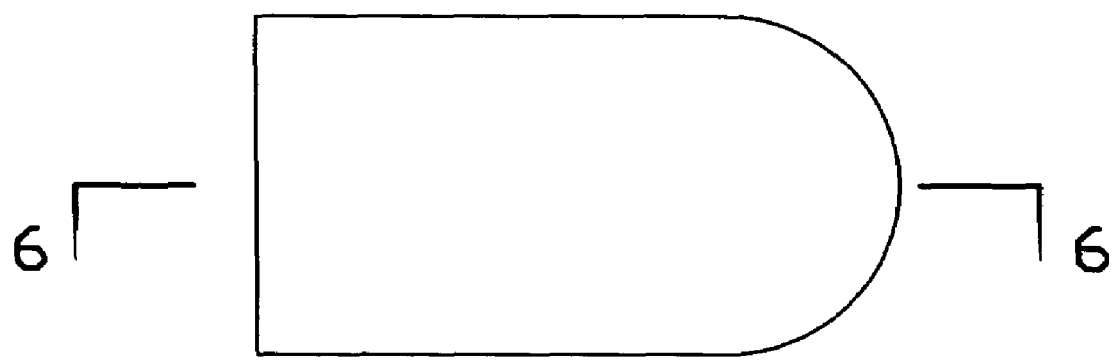
FIG. 5 is a schematic diagram of the jet fin 31 in FIG. 4.
Figure 6:
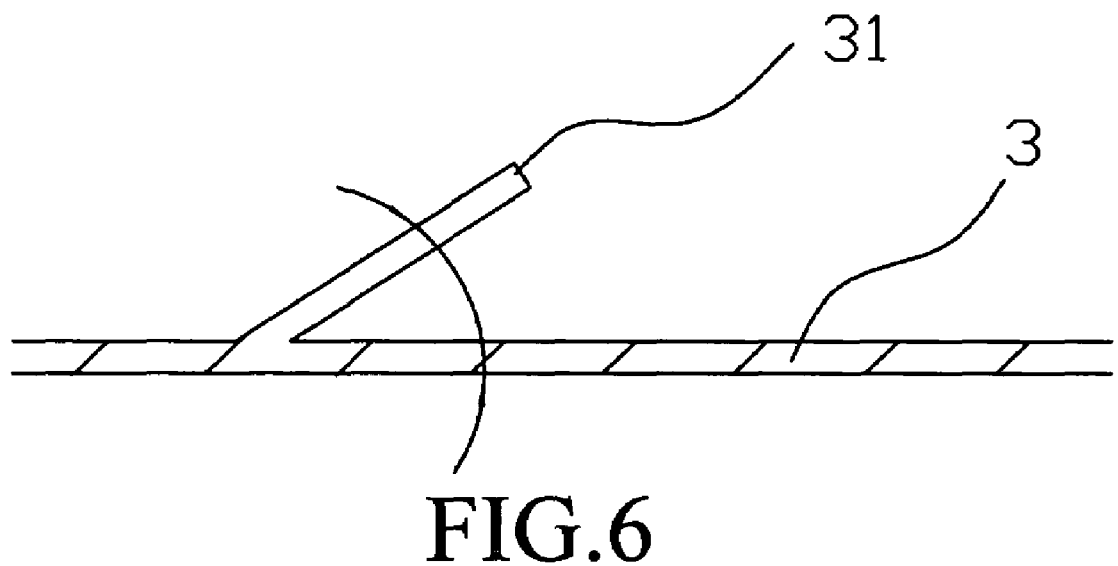
FIG. 6 is a 6-6 section view of the jet fin in FIG. 5.
Figure 7:
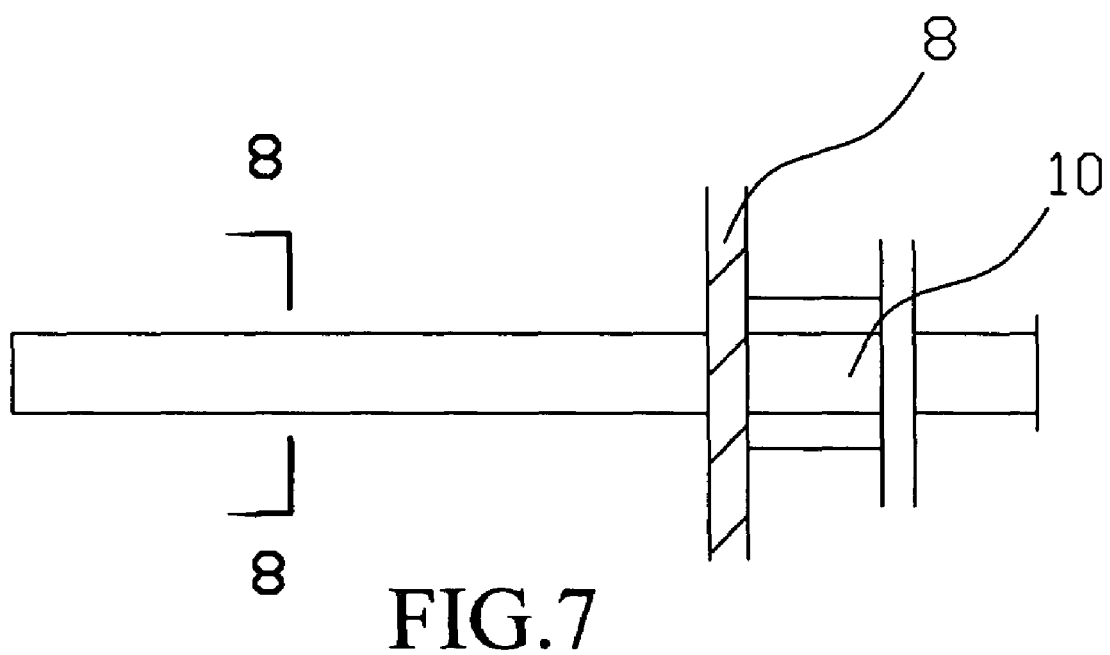
FIG. 7 is a schematic diagram showing the structure of the distributor for the returned liquid (reflex) in the top in FIG. 1.
Figure 8:
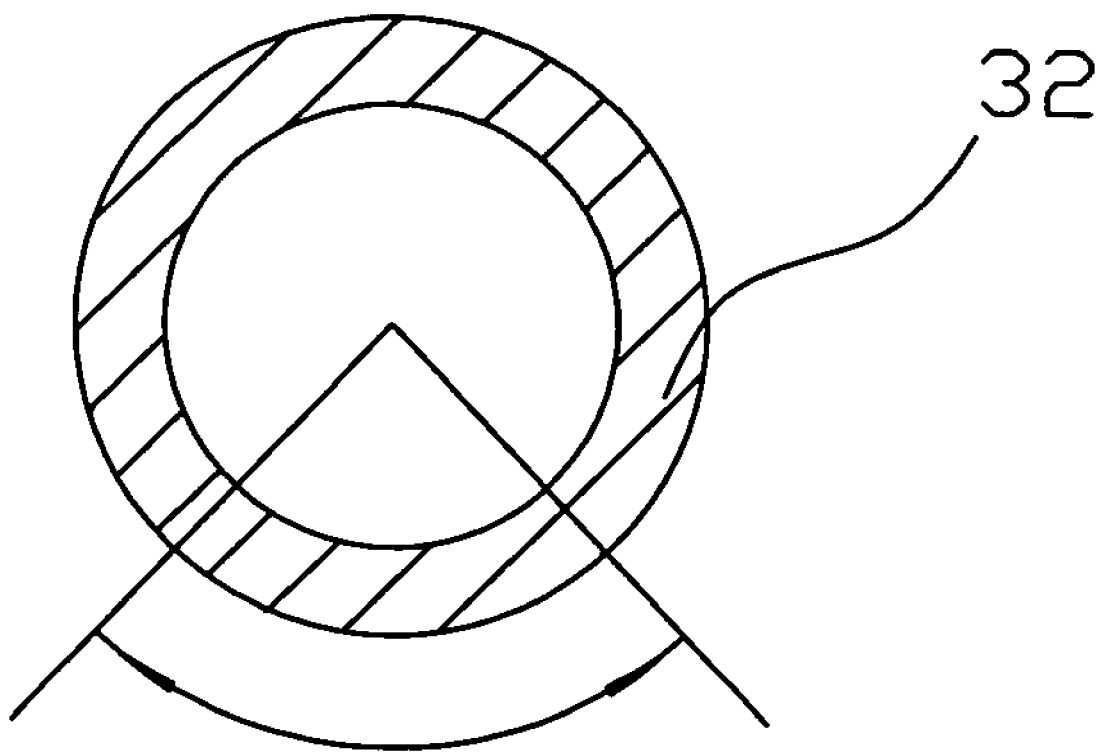
FIG. 8 is a schematic diagram showing the spray angle of the distributor for the returned liquid (reflex) in the top in FIG. 7.

The fractionating column of the invention is described in detail in light of drawings as follows. As shown in FIGS. 1-8, the inside of the column body 8 of the helical fractionating column is divided into three sections.

FIGS. 1-8 are preferred embodiments of the fractionating column according to the invention, wherein, 1($a$) denotes Inlet of the column connecting to the cracking kettle; 2($b_1$), 4($b_2$), 5($b_3$), 7($b_4$) and 16($b_5$) denote hand hole; 3 denotes jet tray; 6 denotes floating valve tray; 8 denotes column body; 9($c$) denotes gas phase outlet; 10($d$) denotes distributor for the returned liquid (reflex) in the top; 11 denotes overflow weir; 12($e_1$) and 13($e_2$) denote outlet for kerosene; 14($f_1$) and 17($f_2$) denote outlet for diesel oil; 15 denotes packing layer of metal Pall ring; 18($g$) denotes outlet for heavy oil; 19 denotes cooling tube; 20 and 22 denote flange; 21 denotes quencher; 23 denotes valve; 24 denotes water outlet tube; 25 denotes water inlet tube; 26 denotes outlet tube for light gasoline; 27 denotes floating valve; 28 denotes liquid-receiving area; 29 denotes bubble area; 30 denotes liquid-falling area; 31 denotes jet fin; and 32 denotes spray hole.

The lower section is jet tray 3 having 5 layers, in the shape of plate, with many jet fins 31 separately set thereon. One end of the jet fin 31 is fixed and the other end is cocked, forming an angle with jet tray 3, commonly in 20-60°, preferably, 36°. The angles increase, equally 36° layer by layer, totally, 180° for layers 1-5. The jet tray 3 can be set up in multilayers, preferably, 5 layers. When the jet tray 3 is set up, every layer is turned an angle parallelly to the next layer, commonly, 20-60°, preferably, 36°, thus layers 1-5 form a helical path, and the Gas-flow ascends along the helical path with turning of 180°. The number of layers can be increased and the enlargement of angle every layer can be decreased, whereas the Gas-flow ascends with turning of 360°. According to the present invention, the resistance of the gas-flow is low and the retention period of gases is prolonged. Moreover, the space between trays is narrowed, and the height of column is decreased to a great degree, thus the investment cost is reduced. The effect is better if the enlargement of angle cocked every layer is consistent with the angle turned parallelly every layer. For better effect, the jet tray 3 can be covered with a coke adsorption layer, preferably, in a thickness of 100 mm. The jet tray 3 in the lower section of column body 8 serves the function of filtration. High components adsorbed on the jet fins 31 descend slowly and distilled continuously with the increasing temperature. The gases produced ascend to form a spiral. While ascending to a higher layer, the gases are further adsorbed. The prolonged time and distance of the passing gases are beneficial to the adsorption.

The middle section of the column body is a packing section, which comprises a packing layer 15 and one layer of floating valve trays 6 on each side of the packing layer 15, the packing layer 15 being one layer of regular fillers selected from metal Pall ring, metal net, metal netted corrugated pattern and metal puncture corrugated pattern. The preferred fillers in the invention is metal Pall ring, 25×25 mm. The function of the packing layer 15 is to filter off impurities in the gases.

The upper section of the column body is a floating valve section. The floating valve tray 6 in the floating valve section comprises an outside wall of the tray, spherical floating valves 27, and overflow weirs 11. The overflow weirs 11 are set on the two ends of floating valve tray 6, and separate the floating valve tray 6 into four areas, namely a floating valve area in the middle, a liquid-receiving area 28 on one side, a liquid-falling area 30 on the other side, and bubble areas 29 on two ends of the floating valve area, wherein the spherical floating valves 27 distribute equally, triangularly, within the floating valve area. The floating valve trays 6 are set on the upper side and lower side of the packing layer 15, in multilayer, preferably, 9 layers, with each one layer on the upper side and the lower side of the packing layer 15 and 7 layers, layers 6-12, over the packing layer 15. Liquid from the above layer enters into liquid-receiving area 28, and after passing through the floating valve area, enters into the overflow weir and the liquid-falling area, and then flow into the liquid-receiving area of the lower layer. The floating valve trays 6 serve the function of fractionation. The triangular arrangement of the floating valves 27 can enable gases and liquid to distribute equally and increases the contact area of gases and liquids, thus providing better fractionation effects. Gases, after passing through the jet tray 3 and being adsorbed and filtered in the packing layer 15, ascend continuously and fractionated in the floating valve trays 6. In this way, an efficient fractionation is achieved.

Quencher 21 is equipped on the top of the column, in the shape of a pot, and comprises a water inlet tube 25, a water outlet tube 24, two valves 23 and a cooling tube 19 therein. The top of the quencher 21 is equipped with an oil outlet tube 26 which is higher than the bottom. The bottom of the quencher 21 is equipped with a U-pattern reflex tube which is connected to a distributor for the returned liquid (reflex) in the top 10($d$) in column body 8. The former end of the distributor for the returned liquid (reflex) 10 is tubular, and the bottom of the distributor is equipped with several spray holes 32, in an arrangement of 3 spray holes being distributed equally within the 60° angle of the round section, 3 lines, transversely, on the distributor for the returned liquid (reflex) 10($d$). The column body 8 is equipped with an inlet connecting to the cracking kettle (1($a$)) and hand holes (2($b_1$), 4($b_2$), 5($b_3$), 7($b_4$) and 16($b_5$)) on one side, and outlets for kerosene (12($e_1$) and 13($e_2$)) and outlets for diesel oil (14($f_1$) and 17($f_2$)) on the other side. The bottom of column body 8 is equipped with an outlet for heavy oil (18($g$)) which is connected, via a flange, to a sediment pot from which the sediment is recycled to the cracking kettle. The top of the column is equipped with a quencher 21, and the cooled liquid is returned to the top of the column body 8 to form a convection with the gas raising to the upper section of the column body 8. Therefore, good quality products can be obtained in high yield, with reduced formation of waste heavy oil and lower consume of energy.

For further raising the quality of product and the yield, the column body 8 can be equipped with one or two quencher(s) identical to quencher 21 on the side(s) of the column body 8, i.e., the middle quencher and the lower quencher. The outside of the column body 8 can be equipped with a jacketed preheater using solar energy or common boilers as thermal sources.

The principle and the operation are as follows: The gases from the cracking kettle enters the bottom of column body 8 via valve 1(a)→jet tray 3→ascends through 5 layers, turns 36° a layer, to form a spiral gas-flow→turns 180°→is filtered in packing layer 15→floats valve tray 6→ascends through 7 layers→outlet 9($c$)→quencher 21; unqualified product from the bottom of quencher 21→distributor for the returned liquid (reflex) 10→column body 8; the light component→ascends and is outputted from outlet tube for light gasoline 26; the heavy components being output from outlets for kerosene 12($e_1$) and 13($e_2$), or outlets for diesel oil 14($f_1$) and 17($f_2$); the sediment enters into the sediment pot via outlet for heavy oil 18($g$), then, via the tube and valve, and is recycled to the cracking kettle. The above is a working cycle.

The helical fractionating column according to the invention has many advantages in comparison with those in the prior art, such as the good effect of fractionation due to the prolonged retention time of the gaseous medium in the column body and having enhanced integrity of separation, decoloration and deodorization, simple structure, convenient manufacturing and maintenance, and low investment cost as well as high product quality etc. Thus, the present invention is worthy to be extended in the petroleum refining industry which uses waste plastics and rubbers as raw materials.

What is claimed is:

1. A helical fractionating column comprising a column body, wherein an inside of said column body is divided into a lower section, a middle section, and an upper section, wherein said lower section is a jet tray section, said middle section is a packing section, and said upper section is a floating valve section.

2. The helical fractionating column, as recited in claim 1, further comprising a jet tray formed in said jet tray section of said lower section, a packing layer formed in said packing section of said middle section, and at least one floating valve tray formed in said floating valve section of said upper section, wherein said packing layer has one layer of said floating valve tray formed on an upper side thereof.

3. The helical fractionating column, as recited in claim 2, wherein said jet tray is in a shape of a plate, and comprises a plurality of jet fins separately set thereon, wherein one end of said each of said jet fins is fixed and another end of said corresponding jet fin is cocked to form a predetermined angle of 20° to 60° with said jet tray, wherein said predetermined angle gradually increases layer by layer, from 0° to 360°.

4. The helical fractionating column, as recited in claim 3, wherein said jet tray has five layers, wherein said layers being turned an angle parallelly to a next layer for an angle of 20° to 60°, from 0° to 360°.

5. The helical fractionating column, as recited in claim 4, wherein said angle between said jet fin and said jet tray increases by 22.5° to 36° for every said layer until said angle reaches 180°, wherein said jet tray is turned parallelly for every said layer by an angle of 22.5° to 36°, wherein said jet tray is covered with a coke adsorption layer.

6. The helical fractionating column, as recited in claim 3, wherein said angle between said jet fin and said jet tray increases by 22.5° to 36° for every said layer until said angle reaches 180°, wherein said jet tray is turned parallelly for every said layer by an angle of 22.5° to 36°, wherein said jet tray is covered with a coke adsorption layer.

7. The helical fractionating column, as recited in claim 2, wherein said at least one floating valve tray comprises an outside wall of said tray, a plurality of spherical floating valves, and a plurality of overflow weirs, wherein said overflow weirs are set on the two ends of said at least one floating valve tray, and separate said at least one floating valve tray into four areas, namely a floating valve area in a middle, a liquid-receiving area on one side, a liquid-falling area on another side, and two bubble areas on two ends of said floating valve area respectively, wherein said spherical floating valves distributing equally and triangularly within said floating valve area.

8. The helical fractionating column, as recited in claim 7, wherein said at least one floating valve tray is set on an upper side and a lower side of said packing layer in multilayer structure, having eight layers on said upper side, and one layer on said lower side of said packing layer.

9. The helical fractionating column, as recited in claim 2, wherein said at least one floating valve tray is set on an upper side and a lower side of said packing layer in multilayer structure, having eight layers on said upper side, and one layer on said lower side of said packing layer.

10. The helical fractionating column, as recited in claim 2, wherein said packing layer is one layer of regular fillers selected from a group consisting of metal Pall ring, metal net, metal netted corrugated pattern, and metal puncture corrugated pattern.

11. The helical fractionating column, as recited in claim 1, further comprising a first and a second quencher each of which is formed in a shape of a pot, and comprises a water inlet tube, a water outlet tube, two valves and a cooling tube, wherein said first quencher is positioned on top of said column body with an oil outlet tube, and said second quencher is positioned on a bottom of said column body with a U-pattern reflex tube connected to a distributor.

12. The helical fractionating column, as recited in claim 11, wherein said column body further comprises an inlet connecting to a cracking kettle on one side, a plurality of first outlets for kerosene, a plurality of second outlets for diesel oil, and a third outlet for heavy oil formed at a bottom of said column body, wherein said third outlet is connected, via a flange, to a sediment pot, wherein said sediment is recycled to said cracking kettle.

13. The helical fractionating column, as recited in claim 1, wherein said column body further comprises an inlet connecting to a cracking kettle on one side, a plurality of first outlets for kerosene, a plurality of second outlets for diesel oil, and a third outlet for heavy oil formed at a bottom of said column body, wherein said third outlet is connected, via a flange, to a sediment pot, wherein said sediment is recycled to said cracking kettle.

* * * * *